(12) United States Patent
Yoshitomi (10) Patent No.: US 11,335,927 B2
(45) Date of Patent: May 17, 2022

(54) FUEL CELL MODULE (71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 16/561,187

(22) Filed: Sep. 5, 2019

(65) Prior Publication Data
US 2020/0091526 A1 Mar. 19, 2020

(30) Foreign Application Priority Data

Sep. 14, 2018 (JP) .............................. JP2018-172832

(51) Int. Cl.
*H01M 8/04082* (2016.01)
*H01M 8/04119* (2016.01)
*B60L 50/72* (2019.01)
*H01M 8/04089* (2016.01)

(52) U.S. Cl.
CPC ......... *H01M 8/04201* (2013.01); *B60L 50/72* (2019.02); *H01M 8/04126* (2013.01); *B60Y 2400/202* (2013.01); *H01M 8/04089* (2013.01); *H01M 2250/20* (2013.01)

(58) Field of Classification Search
None
See application file for complete search history.

(56) References Cited

U.S. PATENT DOCUMENTS 9,809,099 B2  11/2017  Itoga
2014/0110185 A1*  4/2014  Naito ................. H01M 8/2475
                                            180/65.31
(Continued)

FOREIGN PATENT DOCUMENTS

JP  2011065869 A  *  3/2011
JP  2013206855 A  *  10/2013
JP  2014-83875       5/2014
(Continued)

OTHER PUBLICATIONS

Machine translation of JP2013206855A originally published to Yoshinaga on Oct. 2013 (Year: 2013).*

(Continued)

*Primary Examiner* — Ula C Ruddock
*Assistant Examiner* — Mary Grace Byram
(74) *Attorney, Agent, or Firm* — Amin, Turocy & Watson, LLP (57) ABSTRACT

A fuel cell module is mounted in a fuel cell vehicle. In the fuel cell module, an auxiliary device case is provided on a side part of the fuel cell stack. A hydrogen system auxiliary device for supplying and circulating a hydrogen gas and an oxidizing agent system auxiliary device for supplying and discharging an oxygen-containing gas are placed in the auxiliary device case. A humidifier of the oxidizing agent system auxiliary device includes a fuel gas system protection mechanism. When a load is applied from the front side of the fuel cell vehicle, the fuel gas system protection mechanism prevents interference of the humidifier with the hydrogen system auxiliary device and prevents breakage of the hydrogen system auxiliary device.

7 Claims, 7 Drawing Sheets

(56) References Cited

U.S. PATENT DOCUMENTS

2015/0244006 A1    8/2015  Yoshitomi et al.
2017/0043655 A1*  2/2017  Aishima .................. B60K 8/00

FOREIGN PATENT DOCUMENTS

JP        2015-159005    9/2015
WO      2015/049857    4/2015

OTHER PUBLICATIONS

Machine English translation of JP2011065869A from Espacenet originally published to Kobayashi Mar. 2011 (Year: 2011).*
Japanese Office Action for Japanese Patent Application No. 2018-172832 dated Nov. 30, 2021.

* cited by examiner

FUEL CELL MODULE

CROSS-REFERENCE TO RELATED APPLICATION

This application is based upon and claims the benefit of priority from Japanese Patent Application No. 2018-172832 filed on Sep. 14, 2018, the contents of which are incorporated herein by reference.

BACKGROUND OF THE INVENTION

Field of the Invention

The present invention relates to a fuel cell module mounted in a fuel cell vehicle.

Description of the Related Art

Conventionally, there has been a proposal for a fuel cell module mounted, e.g., in a front room (motor room) on the front side of a fuel cell vehicle. For example, according to the disclosure of Japanese Laid-Open Patent Publication No. 2014-083875, a fuel cell module includes a fuel cell stack, an oxygen-containing gas system device for supplying the air, and a fuel gas system device for supplying a hydrogen gas provided in a front room.

SUMMARY OF THE INVENTION

In the fuel cell module, in some cases, fuel gas system devices are placed in an auxiliary device case as a countermeasure against leakage from the fuel gas system devices and protection of the fuel gas system devices. Further, in an attempt to reduce the size and the weight of the fuel cell module, and improve the start-up characteristics, the layout to provide oxygen-containing gas system devices as auxiliary devices together with the fuel gas system devices in an auxiliary device case adjacent to a fuel cell stack has been studied.

However, in the case where the oxygen-containing gas system devices and the fuel gas system devices are stored in the auxiliary device case, there is a demand for structure where, even in the case where a load is applied from the outside, the oxygen-containing gas system devices do not damage the fuel gas system devices.

According to an aspect of the present invention, an object of the present invention is to provide a fuel cell module in which, even in the case where a load is applied from the outside, it is possible to prevent damage of fuel gas system devices.

According to an aspect of the present invention, a fuel cell module is provided. The fuel cell module includes a fuel cell stack mounted in a fuel cell vehicle, an auxiliary device case provided on a side part of the fuel cell stack, a fuel gas system device and an oxygen-containing gas system device stored in the auxiliary device case, and a fuel gas system protection mechanism configured to prevent interference of the oxygen-containing gas system device with the fuel gas system device with respect to application of the load to the auxiliary device case.

In the fuel cell module according to the above aspect, even in the case where the load is applied to the auxiliary device case, it is possible to prevent interference of the oxygen-containing gas system devices with the fuel gas system devices by the fuel gas system protection mechanism. As a result, even in the case where the load is applied from the outside, it is possible to prevent damage to the fuel gas system devices.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

First Embodiment

Figure 1:
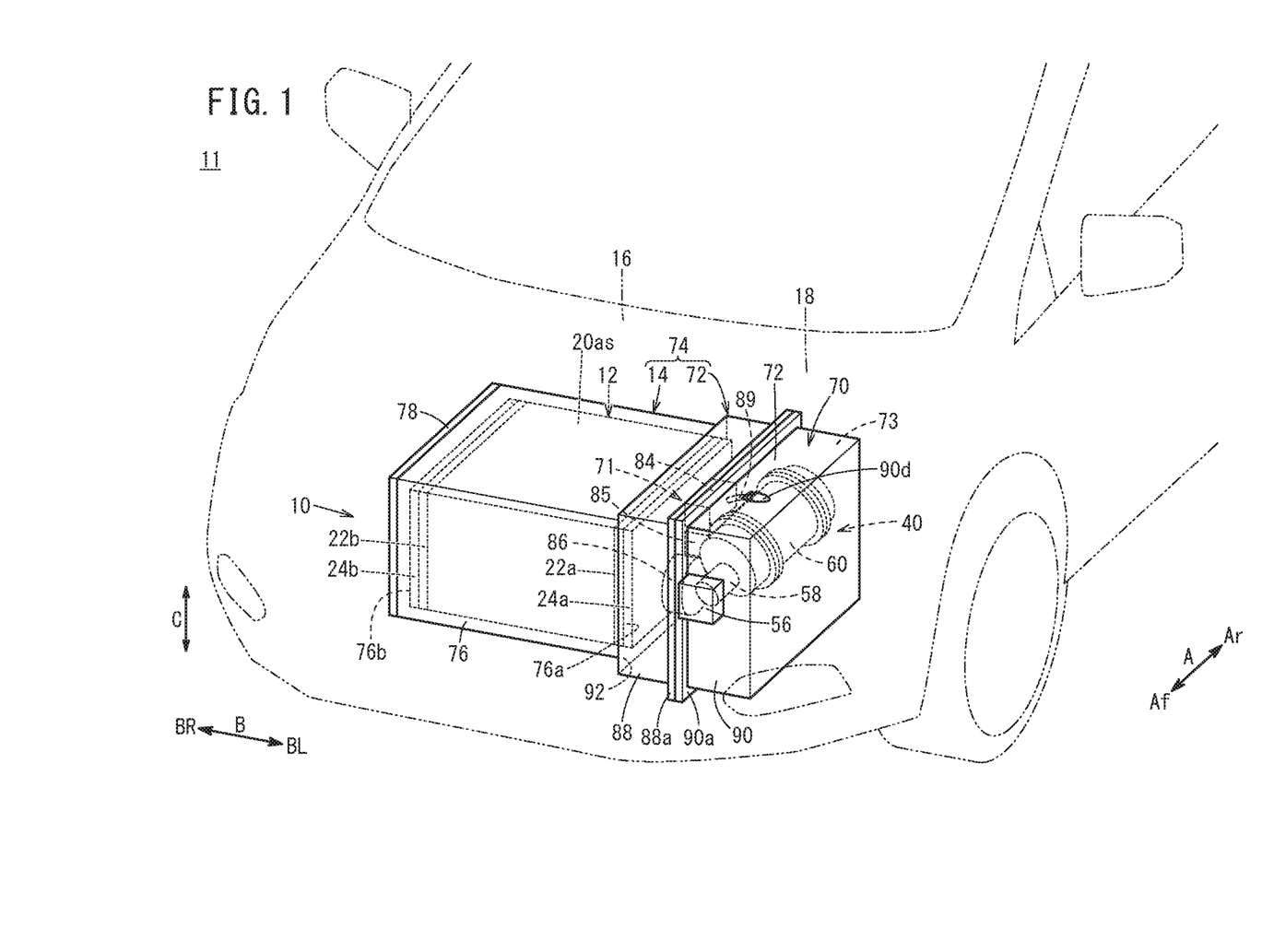
FIG. 1 is a perspective view showing a fuel cell module according to a first embodiment of the present invention.

As shown in FIG. 1, a fuel cell vehicle 11 according to an embodiment of the present invention is equipped with a fuel cell module 10. For example, the fuel cell vehicle 11 is a fuel cell electric automobile. In the following description the "above (upper part (side))" means the "above (upper part (side))" in the vertical direction. In the fuel cell vehicle 11, a stack case 14 containing a fuel cell stack 12 is provided in a front room (motor room) 18 formed forward of a dash board 16 (in a direction indicated by an arrow Af).

The fuel cell stack 12 includes a cell stack body 20*as* formed by stacking a plurality of power generation cells in a vehicle width direction (indicated by an arrow B). A first terminal plate 22*b* is provided at one end of the cell stack body 20*as* in a stacking direction (indicated by an arrow BR). A first insulating plate 24*b* is provided outside the first terminal plate 22*b*. A second terminal plate 22*a* and a second insulating plate 24*a* are provided at the other end of the cell stack body 20*as* in the stacking direction (indicated by an arrow BL). The fuel cell stack 12 is held between a right side panel 78 of the stack case 14 and a first case member 88 of an auxiliary device case 72 through a spacer (not shown), and a tightening load is applied to the fuel cell stack 12 in the stacking direction.

The fuel cell module 10 includes a stack case 14 containing the fuel cell stack 12, and an auxiliary device case 72 containing a fuel cell auxiliary device 70. The stack case 14 and the auxiliary device case 72 make up a case unit 74. The case unit 74 made up of the stack case 14 and the auxiliary device case 72 has, in a plan view, a substantially rectangular shape having the long sides extending in a vehicle width direction.

The stack case 14 includes a case body 76 that is rectangular in a plan view. The case body 76 includes a left opening 76*a* formed on the left side (in the direction indicated by the arrow BL), and a rectangular right opening 76*b* formed on the right side (in the direction indicated by the arrow BR), and has a box shape.

Further, the stack case 14 includes a right side panel 78 which closes the right opening 76*b* of the case body 76. The right side panel 78 is a rectangular panel. The right side panel 78 is joined to the right side of the case body 76 using bolts (not shown). A seal member (not shown) made of elastic material is provided between the case body 76 and the right side panel 78, over the entire periphery of a joint surface joining the case body 76 and the right side panel 78.

The auxiliary device case 72 is a protection case for protecting the fuel cell auxiliary device 70. The auxiliary device case 72 is provided adjacent to the stack case 14 in the horizontal direction and joined to the stack case 14. The auxiliary device case 72 includes a recessed first case member 88 provided adjacent to the stack case 14, and a recessed second case member 90 joined to the first case member 88. The first case member 88 and the second case member 90 are provided such that the recess of the first case member 88 and the recess of the second case member 90 face each other, and a flange 88*a* of the first case member 88 and a flange 90*a* of the second case member 90 contact each other. The flanges 88*a*, 90*a* are tightened together using bolts (not shown), to join the first case member 88 and the second case member 90 together. The first case member 88 and the second case member 90 form a storage space 73 storing hydrogen system auxiliary devices 71 and oxidizing agent system auxiliary devices 40.

The first case member 88 includes a wall 92 joined to the case body 76 (bottom wall of the recessed first case member 88). The first case member 88 is joined to a left end of the case body 76 using bolts (not shown). A seal member (not shown) made of elastic material is provided between the case body 76 and the first case member 88, over the entire periphery of the joint surface joining the case body 76 and the first case member 88. The wall 92 of the first case member 88 has a piping opening (not shown) for insertion of a connection pipe which supplies an oxygen-containing gas or the hydrogen gas to the fuel cell stack 12.

As the fuel cell auxiliary devices 70, hydrogen system auxiliary devices (fuel gas system devices) 71 and oxidizing agent system auxiliary devices 40 (oxygen-containing gas system devices) are placed in the auxiliary device case 72. Mainly, the hydrogen system auxiliary devices 71 are stored in the first case member 88. The hydrogen system auxiliary devices 71 stored in the first case member 88 are an injector 84, an ejector 85, a hydrogen pump 86, and valves (not shown). The injector 84 and the ejector 85 are auxiliary devices for supplying a hydrogen gas supplied from a hydrogen tank (not shown) provided in a center tunnel, etc. of a vehicle body, to the fuel cell stack 12. An injector upstream pipe 89 in fluid communication with a pipe (not shown) coming from a hydrogen tank is connected to the injector 84. One end of the injector upstream pipe 89 is connected to a hydrogen pipe connection port 90*d* provided at an upper end of the second case member 90. The injector upstream pipe 89 extends from a hydrogen pipe connection port 90*d* toward the first case member 88 and the injector upstream pipe 89 is connected to the injector 84. In the specification, the hydrogen system auxiliary devices 71 should be understood as including pipes connecting the auxiliary devices stored in the auxiliary device case 72.

The oxidizing agent system auxiliary devices 40 are stored in the second case member 90. Examples of the oxidizing agent system auxiliary devices 40 stored in the second case member 90 include a humidifier 60 and valves (not shown). As shown in the drawings, the hydrogen system auxiliary devices 71 and the oxidizing agent system auxiliary devices 40 are provided to face each other.

The humidifier 60 is an auxiliary device having a relatively large size in comparison with the other oxidizing agent system auxiliary devices 40 stored in the auxiliary device case 72. In the auxiliary device case 72, the humidifier 60 is provided adjacent to, and on the left side of the injector 84 and the ejector 85 of the hydrogen system auxiliary devices 71 (in the direction indicated by the arrow BL). The humidifier 60 is used for humidifying the compressed air (humidification target fluid) to be supplied to the fuel cell stack 12. The humidifier 60 humidifies the air (humidification target fluid), which is the oxygen-containing gas, using the cathode off gas (humid fluid) containing a large amount of water vapor (water).

Figure 2A:
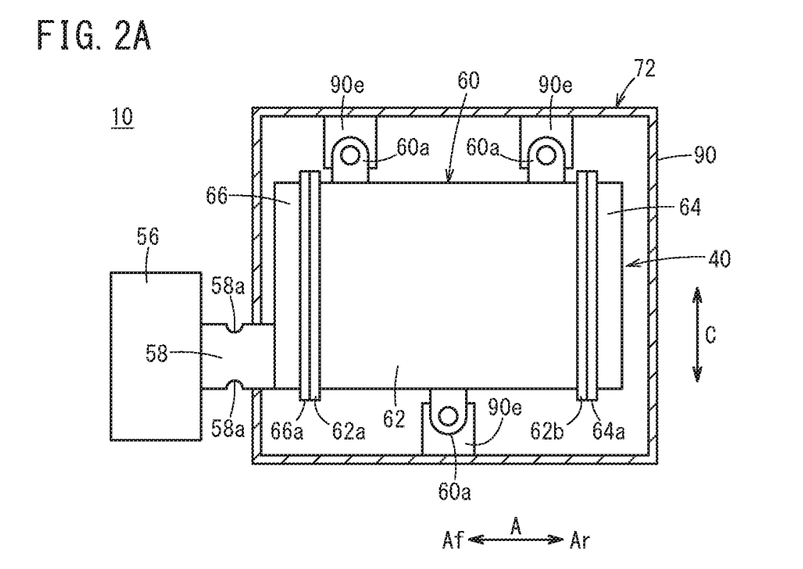
FIG. 2A is a schematic cross sectional view showing an auxiliary device case of the fuel cell module in FIG. 1 viewed from a right direction (BR direction in FIG. 1)

As shown in FIG. 2A, the humidifier 60 includes a cylindrical body 62, an outlet head 66 sealing one end of the body 62, and an inlet head 64 sealing the other end of the body 62. Several thousands of hollow fiber membranes are bound together, and placed inside the body 62. The outlet head 66 and the body 62 are joined together by flanges 62*a*, 66*a*. Further, the inlet head 64 and the body 62 are joined together by flanges 62*b*, 64*a*.

The humidifier 60 is provided in a manner that axial direction of the body 62 is oriented in the front/rear direction (indicated by the arrow A), the outlet head 66 is provided on the front side, and the inlet head 64 is oriented toward the rear side. The pipe 58 which passes through the second case member 90 extends forward from the outlet head 66 (in the direction indicated by the arrow Af). A channel member 56 such as a joint and/or a valve is connected to the pipe 58. The pipe 58 and the channel member 56 are cast products of, e.g., aluminum. Further, the humidifier 60 is fixed to attachment parts 90*e* of the second case member 90 at fixing parts 60*a* provided at a plurality of positions of the body 62.

In the embodiment of the present invention, the pipe 58 and the channel member 56 protrude forward of the auxiliary device case 72. The pipe 58 includes a fracture point 58*a* at which the pipe 58 can be broken apart easily when a load toward the rear side (in the direction indicated by the arrow Ar) is applied to the pipe 58 through the channel member 56. The fracture point 58*a* is a part where the strength against the load in the compression direction is low in comparison with the other part of the pipe 58. For example, the fracture point 58*a* may be a recess of the pipe 58 recessed in the radial direction. Further, the fracture point 58a may be a groove extending in the circumferential direction of the pipe 58. Further, the fracture point 58a may be a thin portion in the form of a slit formed in the length direction of the pipe 58, or a curved portion of the pipe 58. When a load not less than a predetermined value is applied to the pipe 58 in the compression direction, the pipe 58 is broken apart from the fracture point 58a as a start point. The load that breaks apart the pipe 58 is determined to have a value that is smaller the load that breaks the fixing parts 60a by application of the load to the humidifier 60 through the channel member 56 and the pipe 58. By forming the fracture point 58a, a fuel gas system protection mechanism according to the embodiment of the present invention is created.

Hereinafter, operation of a fuel cell module 10 according to the embodiment of the present invention will be descried.

When a load oriented toward the rear side (in the direction indicated by the arrow Ar) is applied from the front of the fuel cell vehicle 11, e.g., by an obstacle, a load oriented toward the rear side is applied to the humidifier 60 through the channel member 56 and the pipe 58 protruding forward of the auxiliary device case 72. The humidifier 60 is held in the auxiliary device case 72 by the fixing parts 60a and kept at a predetermined position in the auxiliary device case 72.

Figure 2B:
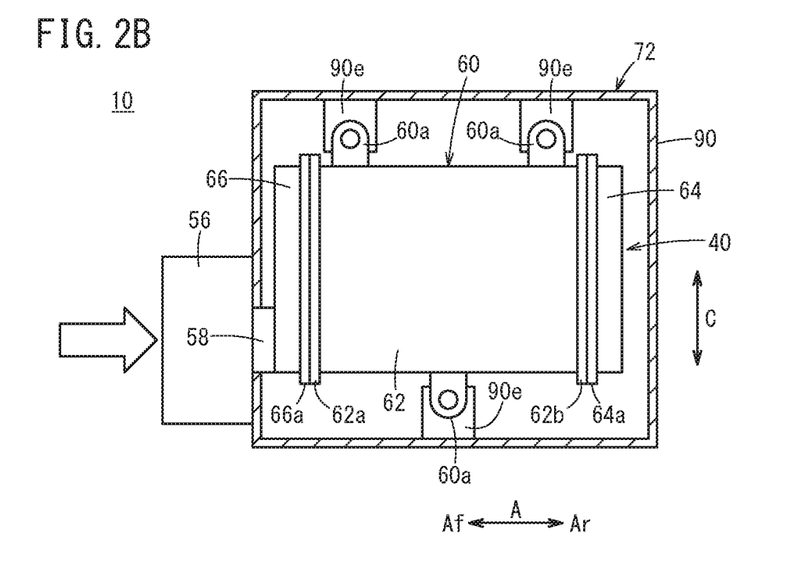
FIG. 2B is a schematic cross sectional view showing operation of the fuel cell module in FIG. 2A.

As shown in FIG. 2B, when the load applied to the channel member 56 and the pipe 58 is increased, the fracture point 58a of the pipe 58 is broken apart before the fixing parts 60a of the humidifier 60 is broken. Thus, the applied load is relaxed. After the pipe 58 is broken apart, the channel member 56 moves (strokes) to contact the auxiliary device case 72, and receives the load from the front by the entire auxiliary device case 72. In this manner, the fixing parts 60a of the humidifier 60 are not broken, and the humidifier 60 is held fixedly and secured in the auxiliary device case 72.

The fuel cell module 10 according to the embodiment of the present invention offers the following advantages.

The fuel cell module 10 according to the embodiment of the present invention is connected to the humidifier 60 (oxygen-containing gas system device) stored in the auxiliary device case 72, and includes the pipe 58 and the channel member 56 extending forward of the auxiliary device case 72. As the fuel gas system protection mechanism, the fracture point 58a is provided for the pipe 58.

In the above structure, even in the case where the load from the front is applied through the channel member 56 and the pipe 58, the fracture point 58a of the pipe 58 is broken apart before the fixing parts 60a of the humidifier 60 are broken. In the structure, the load applied to the humidifier 60 is relaxed, and the humidifier 60 is held without moving in the auxiliary device case 72. As a result, it is possible to prevent interference of the humidifier 60 with the hydrogen system auxiliary device 71 (see FIG. 1) and prevent the hydrogen system auxiliary devices 71 from being broken by the humidifier 60. Further, it is possible to prevent the humidifier 60 from causing damage to the injector upstream pipe 89.

It should be noted that, preferably, the strength of the fracture point 58a provided for the pipe 58 should be determined to be lower than the strength of the fixing parts 60a of the humidifier 60 so that the fracture point 58a can be broken easily in comparison with the fixing parts 60a of the humidifier 60. In this manner, it is possible to prevent the fixing parts 60a from being broken.

Second Embodiment

Figure 3A:
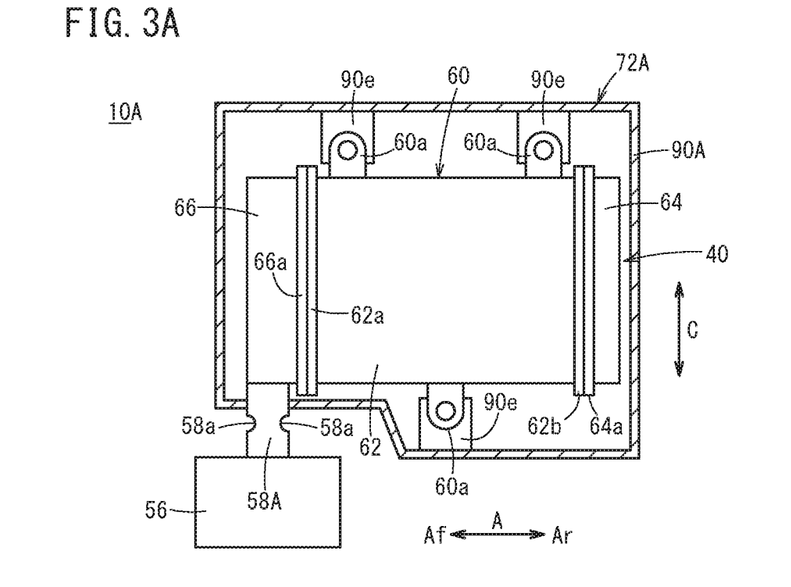
FIG. 3A is a schematic cross sectional view showing an auxiliary device case of a fuel cell module according to a second embodiment, viewed from the right direction (BR direction in FIG. 1)

As shown in FIG. 3A, in a fuel cell module 10A according to a second embodiment, a pipe 58A connected to the outlet head 66 of the humidifier 60 is provided to protrude downward from an auxiliary device case 72A. Further, the channel member 56 connected to the pipe 58A is provided below the pipe 58A.

In the fuel cell module 10A according to the embodiment of the present invention, for example, the pipe 58A and the channel member 56 may be provided on the right side or above the auxiliary device case 72A instead of below the auxiliary device case 72A (second case member 90A). That is, the pipe 58A and the channel member 56 should be connected to a position other than the front of the auxiliary device case 72A.

Preferably, the strength of the pipe 58A is configured in a manner that, when the load is applied to the humidifier 60 through the pipe 58A, the pipe 58A is broken apart before the fixing parts 60a are broken. As shown in the drawings, as necessary, a thin fracture point 58a as a thin portion may be provided partway along the pipe 58A.

Hereinafter, operation of the fuel cell module 10A will be described below.

Figure 3B:
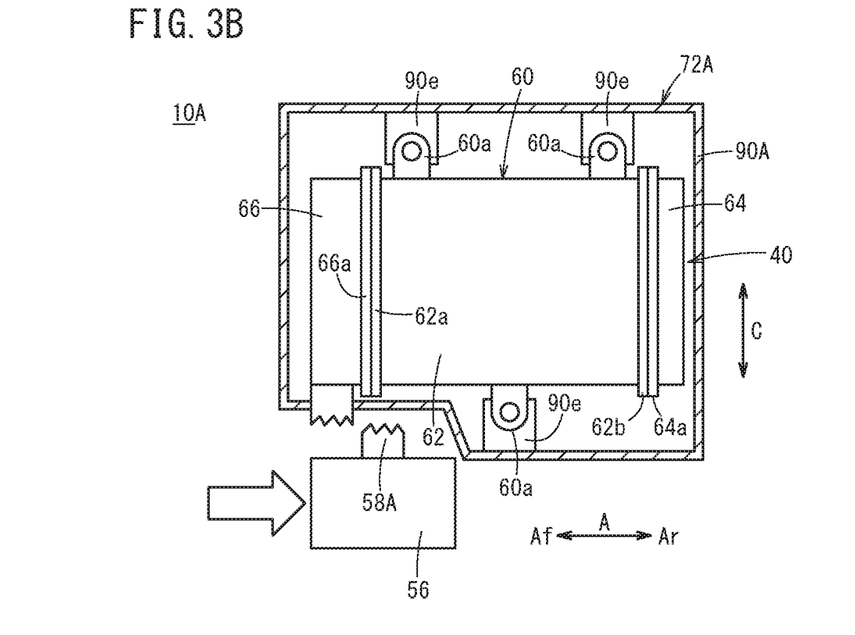
FIG. 3B is a schematic cross sectional view showing operation of the fuel cell module in FIG. 3A.

As shown in FIG. 3B, when a load oriented toward the rear side (in the direction indicated by the arrow Ar) is applied from the front side of the fuel cell vehicle 11, e.g., by an obstacle, a load in the direction indicated by a void arrow is applied to the channel member 56 and the pipe 58A protruding toward the front side of the auxiliary device case 72A. The load is applied to the humidifier 60 through the pipe 58A. When the load applied to the channel member 56 and the pipe 58A is increased, the bending load applied to the pipe 58A is increased. As a result, the pipe 58A is broken apart from the fracture point 58a made up from a thin portion, etc. of the pipe 58A. Accordingly, the application of the load to the humidifier 60 is relaxed, and the humidifier 60 is held fixedly in the auxiliary device case 72A.

In the case where the pipe 58A does not have the fracture point 58a, the pipe 58A is bent from a position adjacent to the joint between the pipe 58A and the auxiliary device case 72A, and the pipe 58A is broken apart before the fixing parts 60a of the humidifier 60 are broken. That is, the position adjacent to the joint between the pipe 58A and the auxiliary device case 72A functions as a fracture point. As described above, the part of the pipe 58A extending in a direction different from the forward direction of the auxiliary device case 72A (in the direction indicated by the arrow Af) becomes a fracture point, and the pipe 58A is broken apart from the fracture point.

The fuel cell module 10A according to the embodiment of the present invention offers the following advantages.

The fuel cell module 10A includes the pipe 58A (and the channel member 56) connected to the humidifier 60 (oxygen-containing gas system device) stored in the auxiliary device case 72A, and extending in a direction other than the forward direction of the auxiliary device case 72A. In the structure, in the case where the load from the front is applied to the channel member 56 and the pipe 58A, the proximal part of the pipe 58A is broken apart. Therefore, it is possible to prevent the fixing parts 60a of the humidifier 60 from being broken. As a result, it is possible to prevent interference of the humidifier 60 with the hydrogen system auxiliary device 71, and prevent the hydrogen system auxiliary device 71 from being broken by the humidifier 60. Further, it is possible to prevent the humidifier 60 from causing damage to the injector upstream pipe 89.

Third Embodiment

Figure 4A:
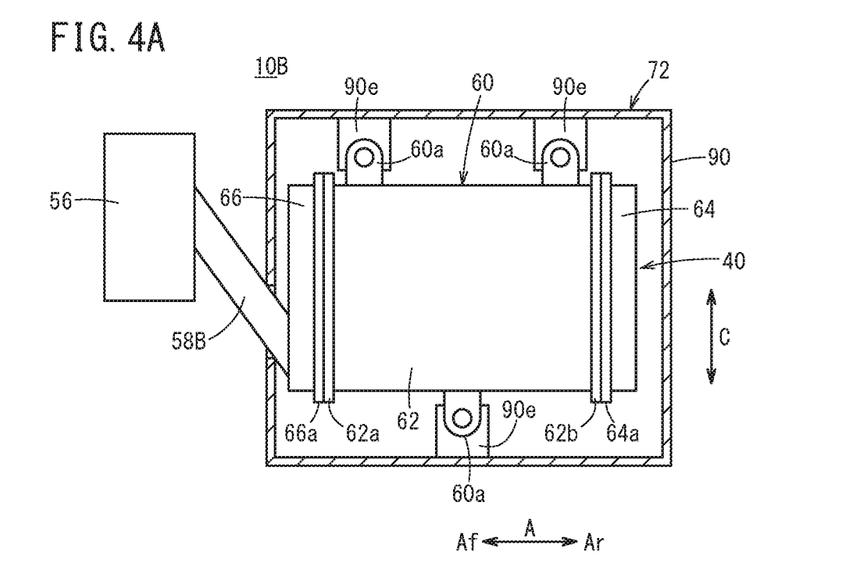
FIG. 4A is a schematic cross sectional view showing an auxiliary device case of a fuel cell module according to a third embodiment, viewed from the right direction (BR direction in FIG. 1)

As shown in FIG. 4A, in a fuel cell module 10B according to a third embodiment, a pipe 58B connected to an outlet head 66 of a humidifier 60 extends in an oblique direction, inclined forward of an auxiliary device case 72.

Hereinafter, operation of the fuel cell module 10B according to the embodiment of the present invention will be described.

Figure 4B:
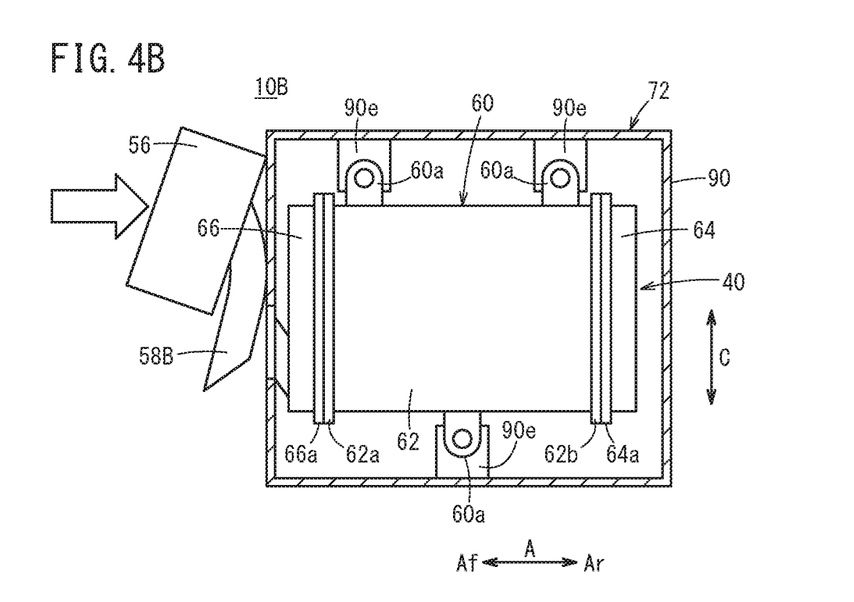
FIG. 4B is a schematic cross sectional view showing operation of the fuel cell module in FIG. 4A.

As shown in FIG. 4B, when a load directed rearward (in the direction indicated by the arrow Ar) is applied from the front of the fuel cell vehicle 11, e.g., by an obstacle, a load in the direction indicated by a void arrow is applied to the channel member 56 and the pipe 58B that protrude further forward than the auxiliary device case 72. The load is applied to the humidifier 60 through the pipe 58B. When the load applied to the channel member 56 and the pipe 58B is increased, a bending load is applied to a position near the proximal part of the pipe 58B extending obliquely, and the pipe 58B is broken apart easily. As a result, the pipe 58B is broken apart before the fixing parts 60a of the humidifier 60 are broken, and the humidifier 60 is held fixedly in the auxiliary device case 72.

The fuel cell module 10B according to the embodiment of the present invention offers the following advantages.

The fuel cell module 10B includes the pipe 58B and the channel member 56 connected to the humidifier 60 (oxygen-containing gas system device) stored in the auxiliary device case 72, and extending obliquely forward of the auxiliary device case 72. In the structure, even in the case where the load from the front is applied to the channel member 56 and the pipe 58B, since the pipe 58B is broken apart easily, it is possible to prevent the fixing parts 60a of the humidifier 60 from being broken. As a result, it is possible to prevent interference of the humidifier 60 with the hydrogen system auxiliary device 71, and prevent the hydrogen system auxiliary device 71 from being broken by the humidifier 60. Further, it is possible to prevent the humidifier 60 from damaging the injector upstream pipe 89.

Fourth Embodiment

Figure 5:
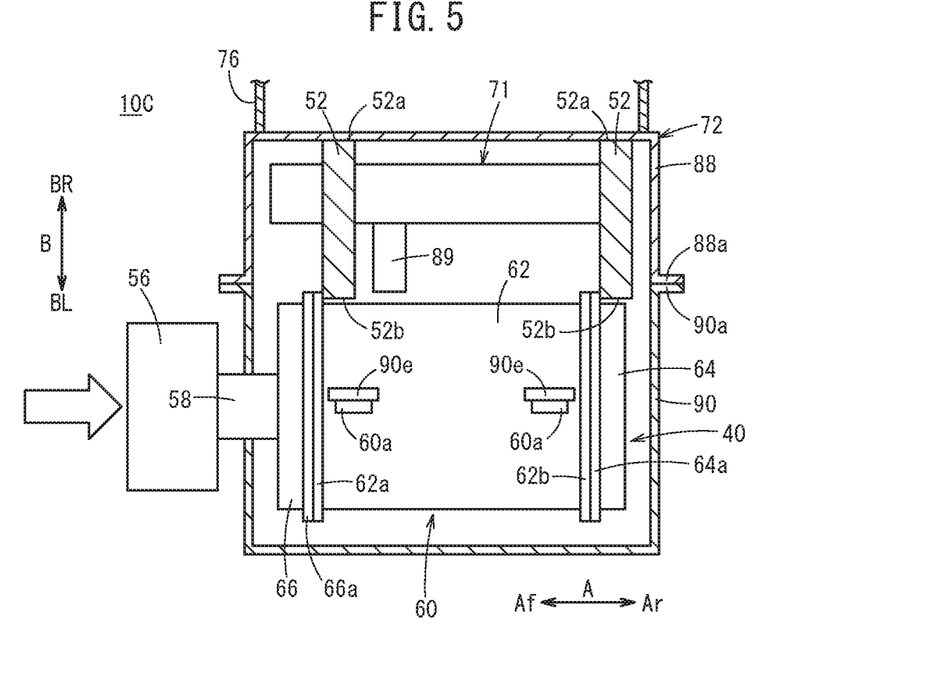
FIG. 5 is a schematic cross sectional view showing an auxiliary device case of a fuel cell module according to a fourth embodiment, viewed from above (C direction in FIG. 1)

As shown in FIG. 5, the fuel cell module 10C according to a fourth embodiment includes, in the auxiliary device case 72, stoppers 52 for preventing the humidifier 60 from moving closer to the hydrogen system auxiliary device 71, and preventing interference of the humidifier 60 with the hydrogen system auxiliary device 71. Each of the stoppers 52 is in the form of a rod member having a proximal part 52a connected to the inner wall of the first case member 88, and a distal end 52b extending in a left-right direction up to a position close to the humidifier 60. A plurality of the stoppers 52 are provided at intervals in the front-rear direction. It should be not that the stopper 52 is not limited to the rod shaped member extending in the left-right direction. The stopper 52 may have a shape capable of preventing the humidifier 60 from moving closer to the hydrogen system auxiliary device 71, preventing interference of the humidifier with the hydrogen system auxiliary device 71, and guiding the humidifier 60 to a safe position. As another possible structure of the stopper 52, for example, the stopper 52 may be a plate shaped member extending from the inner wall of the first case member 88 as a partition between the hydrogen system auxiliary device 71 and the humidifier 60.

Hereinafter, operation of the fuel cell module 10C according to the embodiment of the present invention will be described.

When a load directed toward the rear side (in the direction indicated by the arrow Af) is applied from the front of the fuel cell vehicle 11, e.g., by an obstacle, a load illustrated by a void arrow is applied to the channel member 56 and the pipe 58 that protrude further forward than the auxiliary device case 72. The load directed toward the rear side (in the direction indicated by the arrow Ar) is applied to the humidifier 60 through the pipe 58. As a result, the fixing parts 60a of the humidifier 60 are damaged, and the humidifier 60 starts to move. At this time, movement of the humidifier 60 in the direction toward the hydrogen system auxiliary device 71 is prevented by the stoppers 52. As a result, the movement direction of the humidifier 60 is guided in a safe direction where the hydrogen system auxiliary device 71 is not present.

The fuel cell module 10C according to the embodiment of the present invention offers the following advantages.

The fuel cell module 10C includes the stoppers 52. The stoppers 52 are provided inside the auxiliary device case 72 and in a neighborhood of the humidifier 60 (oxygen-containing gas system device) and prevent movement of the humidifier 60 in the direction toward the hydrogen system auxiliary device 71. In the structure, even in the case where the fixing parts 60a of the humidifier 60 are broken due to application of the load and the humidifier 60 is moved, the humidifier 60 does not contact the hydrogen system auxiliary device 71, and it is possible to prevent the hydrogen system auxiliary device 71 from being broken.

Fifth Embodiment

Figure 6A:
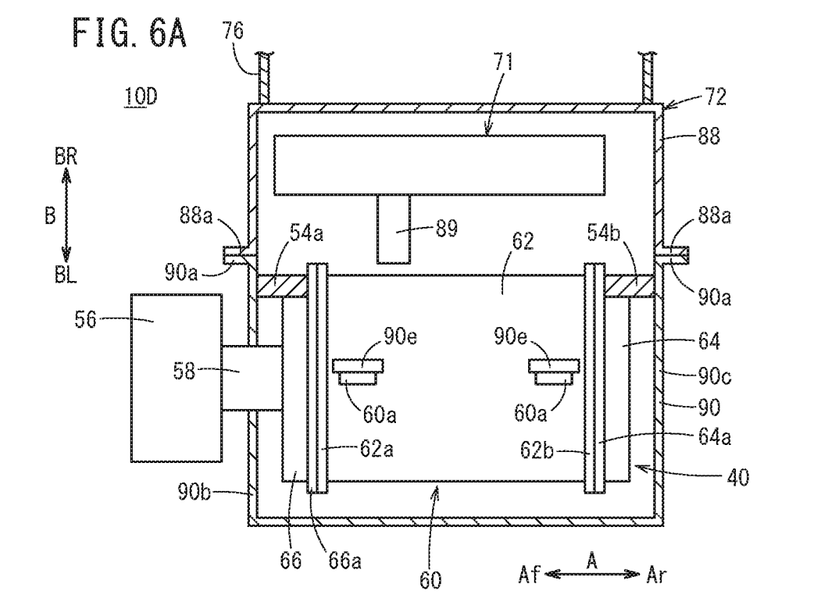
FIG. 6A is a schematic cross sectional view showing an auxiliary device case of a fuel cell module according to a fifth embodiment, viewed from above (C direction in FIG. 1)

As shown in FIG. 6A, a fuel cell module 10D according to a fifth embodiment includes, in the auxiliary device case 72, a first support member 54a and a second support member 54b for preventing movement of the humidifier 60. The first support member 54a is inserted between a flange 66a of the outlet head 66 and a front surface 90b of the second case member 90. Further, the second support member 54b is inserted between the flange 64a of the inlet head 64 and the rear surface 90c of the second case member 90. Preferably, the breaking strength of the first support member 54a and the second support member 54b are higher than the breaking strength of the fixing parts 60a against application of the load directed from the front side to the rear side. It should be noted that the first support member 54a may be provided at any position forward of the humidifier 60. Further, the first support member 54a may have any shape as long as the first support member 54a can fill the space between the front surface 90b of the second case member 90 and the front of the humidifier 60. Further, the second support member 54b may be provided at any position rearward of the humidifier 60. Further, the second support member 54b may have any shape as long as the second support member 54b can fill the space between the rear surface 90c of the second case member 90 and the rear of the humidifier 60.

Hereinafter, operation of the fuel cell module 10D according to the embodiment of the present invention will be described.

Figure 6B:
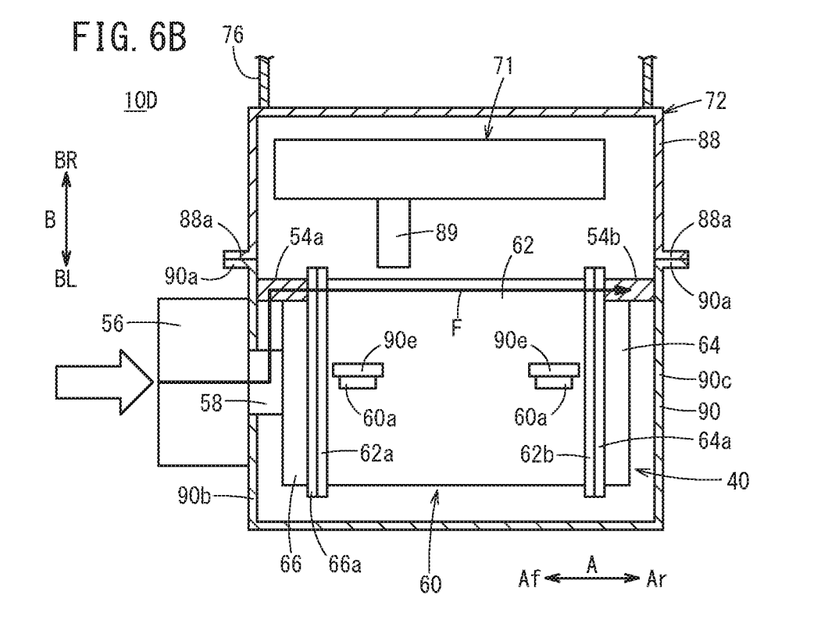
FIG. 6B is a schematic cross sectional view showing operation of the fuel cell module in FIG. 6A.

As shown in FIG. 6B, when a load is applied from the front of the fuel cell vehicle 11, e.g., by an obstacle, toward the rear side (in the direction indicated by the arrow Ar), a load directed in the direction indicated by a void arrow is applied to the channel member 56 and the pipe 58 protruding further forward than the auxiliary device case 72. The load is applied to the humidifier 60 through the pipe 58 toward the rear side (in the direction indicated by the arrow Ar). As shown by an arrow F in FIG. 6B, this load is transmitted to the rear surface 90c of the second case member 90 through the first support member 54a and the second support member 54b. At this time, the load applied to the fixing parts 60a of the humidifier 60 is distributed to the second support member 54b. Therefore, even in the case where the load is applied to the humidifier 60 through the channel member 56 and the pipe 58, the fixing parts 60a are not broken and remain intact.

The fuel cell module 10D according to the embodiment of the present invention offers the following advantages.

The fuel cell module 10D includes the first support member 54a positioned in a space between the front side (outlet head 66) of the humidifier 60 and the front surface 90b of the second case member 90, and the second support member 54b provided in a space between the rear portion (inlet head 64) of the humidifier and the rear surface 90c of the second case member 90. In the structure, even in the case where the load is applied to the humidifier 60 through the channel member 56 and the pipe 58, it is possible to distribute the load to the first support member 54a and the second support member 54b. As a result, it is possible to prevent breakage of the fixing parts 60a, prevent movement of the humidifier 60, and prevent breakage of the hydrogen system auxiliary device 71. Further, in the fuel cell module 10D according to the embodiment of the present invention, since the humidifier 60 can be used as a channel for distributing the load and as a member for achieving the required strength, it is possible to improve the strength of the auxiliary device case 72 without increasing the thickness and the weight of the auxiliary device case 72.

Sixth Embodiment

Figure 7A:
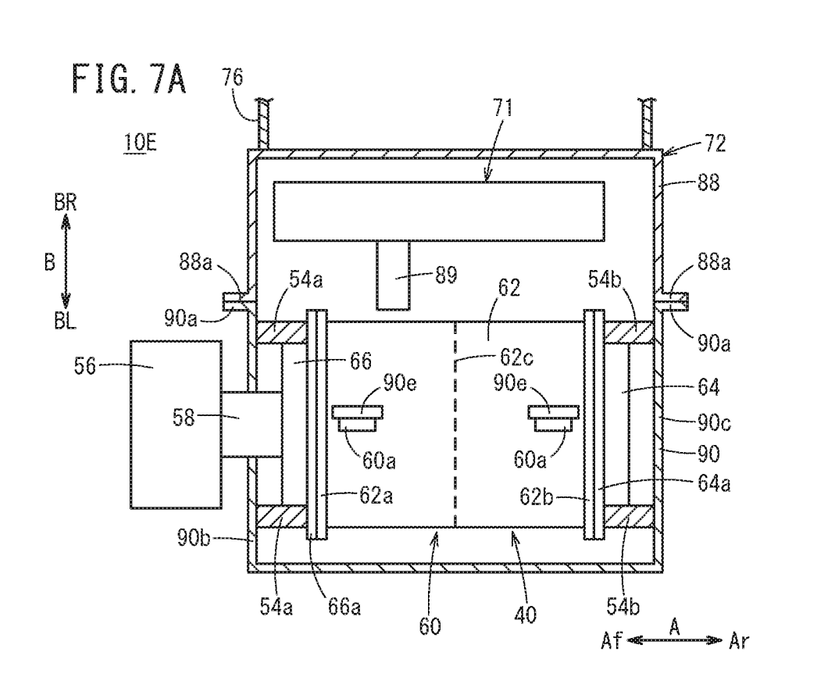
FIG. 7A is a schematic cross sectional view showing an auxiliary device case of a fuel cell module according to a sixth embodiment, viewed from above (C direction in FIG. 1)

As shown in FIG. 7A, the fuel cell module 10E according to the sixth embodiment includes, in the auxiliary device case 72, first support members 54a and second support members 54b for preventing movement of the humidifier 60. Further, the body 62 of the humidifier 60 includes a displacement absorber 62c which is broken apart when a load of not less than a predetermined value is applied.

The first support members 54a are inserted between a flange 66a of the outlet head 66 and a front surface 90b of the second case member 90. Further, the second support members 54b are inserted between the flange 64a of the inlet head 64 and the rear surface 90c of the second case member 90. Preferably, the breaking strength of the first support members 54a and the second support members 54b is higher than the breaking strength of the fixing parts 60a against application of the load directed from the front side to the rear side. It should be noted that the first support members 54a may be provided at any position forward of the humidifier 60. Further, the first support members 54a may have any shape as long as the first support members 54a can fill the space between the front surface 90b of the second case member 90 and the front of the humidifier 60. Further, the second support members 54b may be provided at any position rearward of the humidifier 60. Further, the second support members 54b may have any shape as long as the second support members 54b can fill the space between the rear surface 90c of the second case member 90 and the rear of the humidifier 60.

For example, the displacement absorber 62c is formed as a thin portion or a curved portion in the body 62 to have structure that makes it possible to absorb energy generated by displacement of the auxiliary device case 72 and/or application of the load to the auxiliary device case 72.

Hereinafter, operation of the fuel cell module 10E according to the embodiment of the present invention will be described.

Figure 7B:
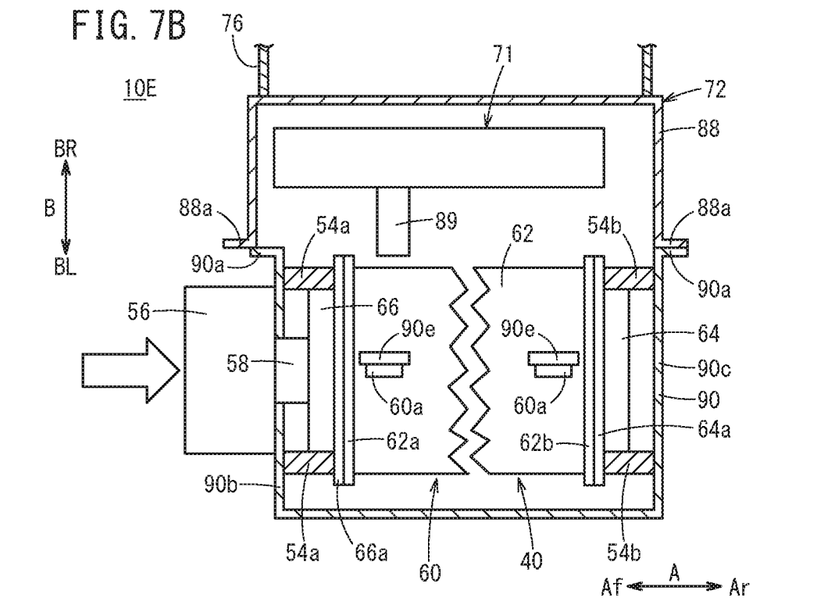
FIG. 7B is a schematic cross sectional view showing operation of the fuel cell module in FIG. 7A.

As shown in FIG. 7B, when a load is applied from the front of the fuel cell vehicle 11, e.g., by an obstacle, toward the rear side (in the direction indicated by the arrow Ar), a load in the direction indicated by a void arrow is applied to the channel member 56 and the pipe 58 protruding further forward than the auxiliary device case 72. The load is applied to the humidifier 60 through the pipe 58. This load is transmitted to a rear surface 90c of the second case member 90 through the first support members 54a and the second support members 54b. At this time, the load applied to the fixing parts 60a of the humidifier 60 is distributed to the second support members 54b. Therefore, the fixing parts 60a are not broken and remain intact.

When an additional load is applied to cause deformation of the second case member 90 of the auxiliary device case 72, and the load is applied from the second case member 90 to the humidifier 60, the displacement absorber 62c of the humidifier 60 is broken apart or deformed. In the structure, energy generated by displacement of the second case member 90 and/or application of the load to the second case member 90 is absorbed. As a result, breakage of the fixing parts 60a of the humidifier 60 is prevented, and the humidifier 60 is kept fixed at a predetermined position.

The fuel cell module 10E according to the embodiment of the present invention offers the following advantages.

The fuel cell module 10E includes the first support members 54a provided in the space between the front of the humidifier 60 and the front surface 90b of the second case member 90, and the second support members 54b provided in the space between the rear of the humidifier 60 and the rear surface 90c of the second case member 90, and the humidifier 60 includes the displacement absorber 62c which is breakable or deformable by application of the load. In the structure, it is possible to prevent breakage of the fixing parts 60a, prevent movement of the humidifier 60, and prevent breakage of the hydrogen system auxiliary device 71. Further, in the fuel cell module 10E according to the embodiment, since the humidifier 60 can be used as a channel for distributing the load and/or a member for the achieving the required strength, it is possible to improve the strength of the auxiliary device case 72 without increasing the thickness and the weight of the auxiliary device case 72.

Although the preferred embodiments of the present invention have been described, the present invention is not limited to these embodiments. It is a matter of course that various modifications may be made without departing from the gist of the present invention. For example, a fuel cell module which achieves protection of the hydrogen system auxiliary device 71 may be produced by combining a plurality of characteristic features shown in the first to sixth embodiments. Further, the structure for protecting the hydrogen system auxiliary device 71 may be applied to the oxidizing agent system auxiliary device 40 other than the humidifier 60, and may be applied to valves, a gas liquid separator tank, or an air pump, etc.

What is claimed is:

1. A fuel cell module comprising:
   a fuel cell stack mounted in a fuel cell vehicle;
   an auxiliary device case provided on a side part of the fuel cell stack;
   a fuel gas system device and an oxygen-containing gas system device stored in the auxiliary device case, the oxygen-containing gas system device including a humidifier;
   a pipe connected to the humidifier and extending outward from the auxiliary device case;
   fixing parts arranged at a plurality of locations on the humidifier, the fixing parts fixing the humidifier to the auxiliary device case; and a fuel gas system protection mechanism configured to prevent interference of the oxygen-containing gas system device with the fuel gas system device with respect to application of a load to the auxiliary device case, wherein the fuel gas system protection mechanism is a fracture point in the pipe, and a fracture load at which the fracture point is fractured is smaller than a breaking load at which the fixing parts are broken by application of the load to the fixing parts through the pipe.

2. The fuel cell module according to claim 1, wherein the fracture point is a thin portion provided for the pipe, a curved portion of the pipe, or a proximal portion of the auxiliary device case extending in a direction different from a forward direction of the auxiliary device case.

3. The fuel cell module according to claim 1, wherein the fuel gas system protection mechanism comprises:

a stopper provided inside the auxiliary device case, provided in a neighborhood of the oxygen-containing gas system device, and configured to prevent movement of the oxygen-containing gas device in a direction toward the fuel gas system device.

4. The fuel cell module according to claim 1, wherein the fuel gas system protection mechanism comprises:

a first support member provided between a front part of the oxygen-containing gas system device and a front surface of the auxiliary device case; and a second support member provided between a rear part of the oxygen-containing gas system device and a rear surface of the auxiliary device case.

5. The fuel cell module according to claim 4, wherein the oxygen-containing gas system device includes a displacement absorber configured to be broken apart or deformable by application of a load from the first support member.

6. The fuel cell module according to claim 1, wherein the auxiliary device case comprises:

a first case member accommodating the fuel gas system device; and a second case member provided to face the first case member and accommodating the oxygen-containing gas system device including the humidifier, and wherein the fuel gas system device stored in the first case member and the oxygen-containing gas system device stored in the second case member are provided to face each other in a width direction of the fuel cell vehicle.

7. The fuel cell module according to claim 6, wherein a fuel gas pipe connection port is provided in the second case member, and a fuel gas pipe connecting the fuel gas pipe connection port and the fuel gas system device pass through the second case member.

* * * * *